(No Model.)
J. K. PUMPELLY.
SECONDARY BATTERY.
No. 442,391. Patented Dec. 9, 1890.
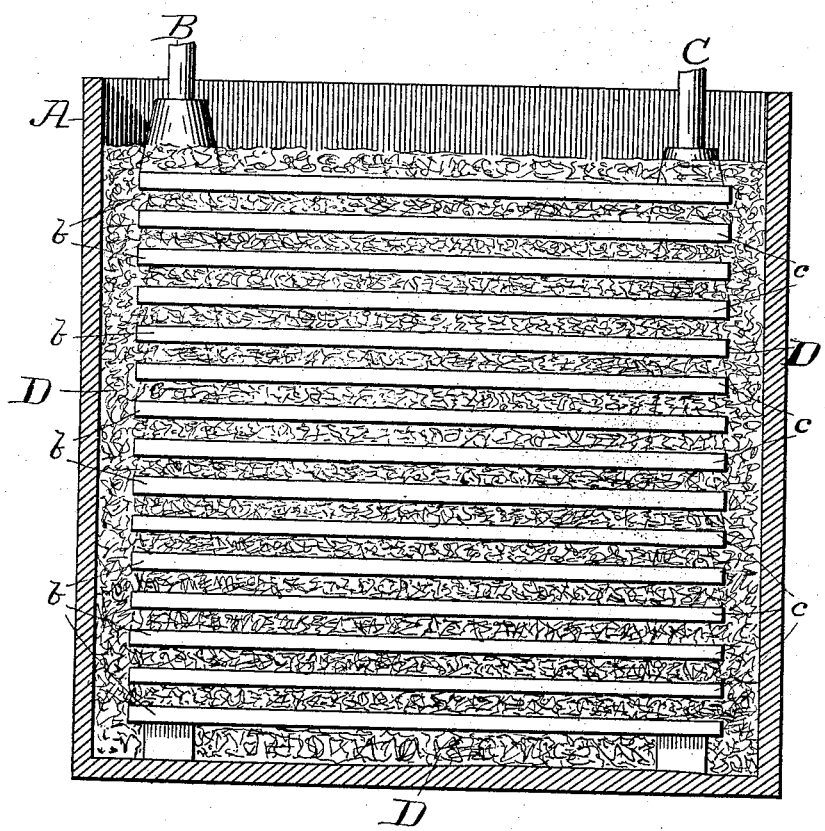

UNITED STATES PATENT OFFICE.

JAMES KENT PUMPELLY, OF CHICAGO, ILLINOIS.

SECONDARY BATTERY.

SPECIFICATION forming part of Letters Patent No. 442,391, dated December 9, 1890.

Application filed March 24, 1890. Serial No. 345,100. (No model.)

*To all whom it may concern:*

Be it known that I, JAMES KENT PUMPELLY, of Chicago, Cook county, Illinois, have invented certain new and useful Improvements in Electrical Batteries, of which the following is a full, clear, and exact description, reference being had to the accompanying drawing, and to the letters of reference marked thereon.

In a previous patent granted to me December 3, 1889, No. 416,299, for improvements in secondary batteries, I have described the advantages to be obtained from "cellulose made from fiber." Experiments and investigation have since demonstrated that while such form of cellulose is preferable, yet any cellulose which is porous and absorbent, whether in its pure state or homogeneous, (either naturally or artificially,) with any one of several kinds of wood-pulp fiber properly treated, will answer to a greater or less extent just as well for all practical purposes.

The object of my invention is the same as that set forth in the aforesaid Letters Patent—namely, to obtain to all practical intent and purpose a dry battery, to obtain the same general efficiency throughout the battery, and to prevent to a greater extent than has ever been accomplished before the sulphating of the electrodes, and besides these to greatly cheapen the cost of the battery, substantially as hereinafter fully described, and as illustrated in the drawing, in which the figure shows a vertical transverse section of my improved battery.

In the drawing, A represents a cell of a rectangular box shape or of such other shape as may be best adapted to contain the electrodes of an electrical secondary battery.

B represents the negative electrode composed of a suitable number of grids or plates *b b*, and C the positive electrode composed of a complementary set of corresponding grids or plates *c c*, which, as shown in the drawing, alternate with the negative plates *b*.

D represents loose cellulose, which is both absorbent and porous, and which is packed in the cell between the plates of the electrodes and around the same, so as to effectually separate and cover the said plates. When the cellulose is thus packed in the cell, a sufficient quantity of electrolytic solution is poured into the same, so as to thoroughly saturate the cellulose, whereupon the battery is ready to be "charged" and "discharged." The loose cellulose packed in the cell in the manner above explained prevents the gravitation and consequent concentration of the acid in the electrolyte at the bottom of the cell, thus rendering the upper plates just as efficient as the lower ones, which has not heretofore been the case. The use of cellulose in this manner makes practically a dry battery, from which the liquid solution will not spill when the batteries are used for traction work or for illuminating purposes on moving vehicles or vessels. It has also been demonstrated that by the use of cellulose in the manner described there is very little evaporation, and the batteries will last from three to five months without requiring replenishing with the solution. Moreover, the plates, being thoroughly protected, will not sulphate, but will remain clean even though used or allowed to remain unused, (the worst thing that can befall an electrical secondary battery.)

Pure cellulose will last forever in an electrical battery and its use is much preferred; but commercially and for the practical purposes of my improved battery cellulose mixed with certain kinds of wood-pulp fiber—as, for instance, spruce or poplar, or woods possessing like characters—will answer just as well.

It makes no difference as far as the spirit of my invention is concerned what the proportions of the admixture of cellulose and wood-pulp fiber are. I prefer, however, to use not less than forty per cent. of cellulose.

In the process of preparation of wood-pulp fiber from certain woods sufficient cellulose is developed to permit of my using the same as a homogeneous mass without further manipulation. Other wood-pulp fiber, however, would have to have mixed with it pure cellulose. In either case I wish to be understood as considering the same within the scope of my invention.

I have hereinbefore described the cellulose and cellulose and wood-pulp fiber mixed as being in a loose state. I do not desire to be understood as meaning that such condition is the only one it can be used in. As a matter of fact, it can be compressed into a card-board or paper form or into thick porous pads, or converted into other fabric and inserted between the plates or between and around the plates of the battery, although in any of these cases there would be more or less free liquid solution, which not being absorbed would be subject to all the objections now existing to the use of the free electrolyte. Besides using cellulose or cellulose and wood-pulp fiber in the loose or compact form independent of the plates of the electrodes, it is but a step to appreciate the use of either in the construction of the plate itself for the purpose of preventing buckling and consequent short-circuiting, as well as for constituting a means for supporting the active material or peroxides used in the construction of the plates.

I wish to be understood as considering cellulose in any form or construction, except that covered by the aforesaid patent granted to me December 3, 1889, and numbered 416,299, as coming within the spirit of my invention.

What has been said hereinbefore about the advantages of cellulose in secondary batteries applies with equal pertinency to primary batteries.

What I claim is—

1. The combination, with an electrical battery, of cellulose and wood-pulp fiber, as set forth.

2. The combination, with an electrical secondary battery and the electrodes thereof, of cellulose and wood-pulp fiber interposed between said electrodes so as to separate the same.

3. The combination, with an electrical secondary battery having electrodes each consisting of a suitable number of connected plates and arranged with reference to one another, of cellulose and wood-pulp fiber interposed so as to separate said electrodes so that the plates of the one will not touch the plates of the other.

JAMES KENT PUMPELLY.

Witnesses:
F. H. GOIN,
FRANK D. THOMASON.